H. PETERSEN.
LINOTYPE MACHINE.
APPLICATION FILED JUNE 5, 1909.
992,900.
Patented May 23, 1911.
6 SHEETS—SHEET 3.
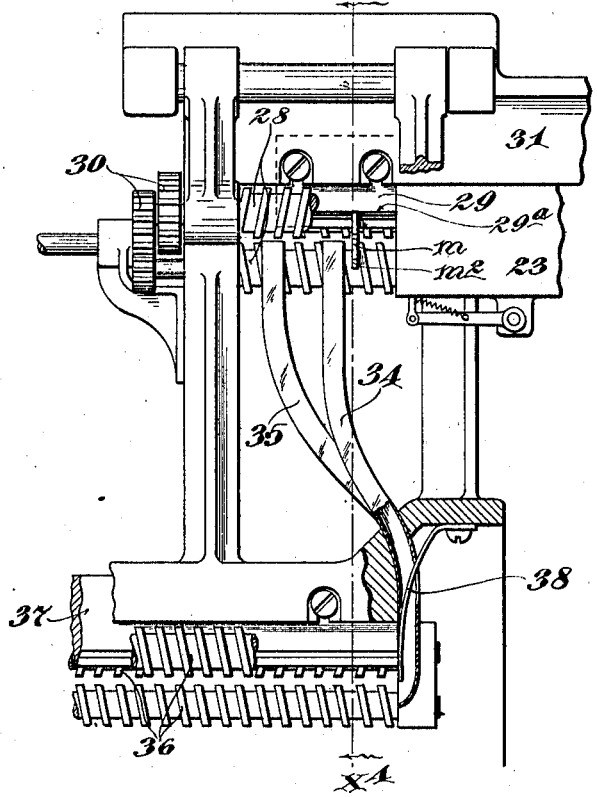
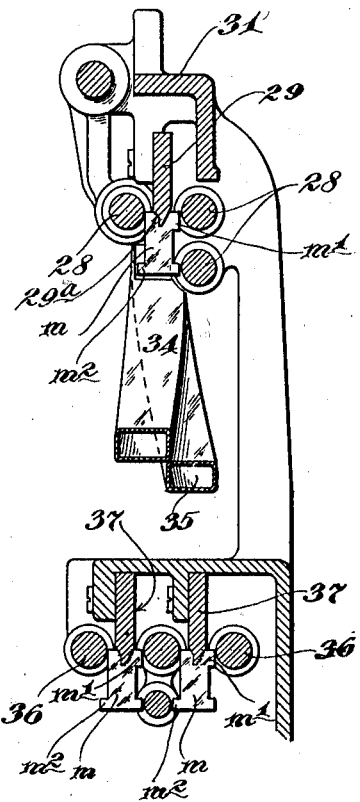
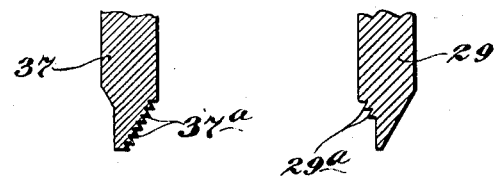
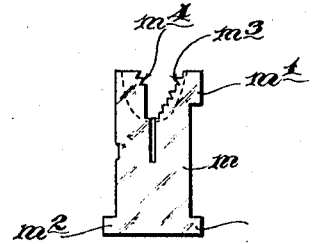
Witnesses:
Inventor:
Hans Petersen
By his Attorneys:

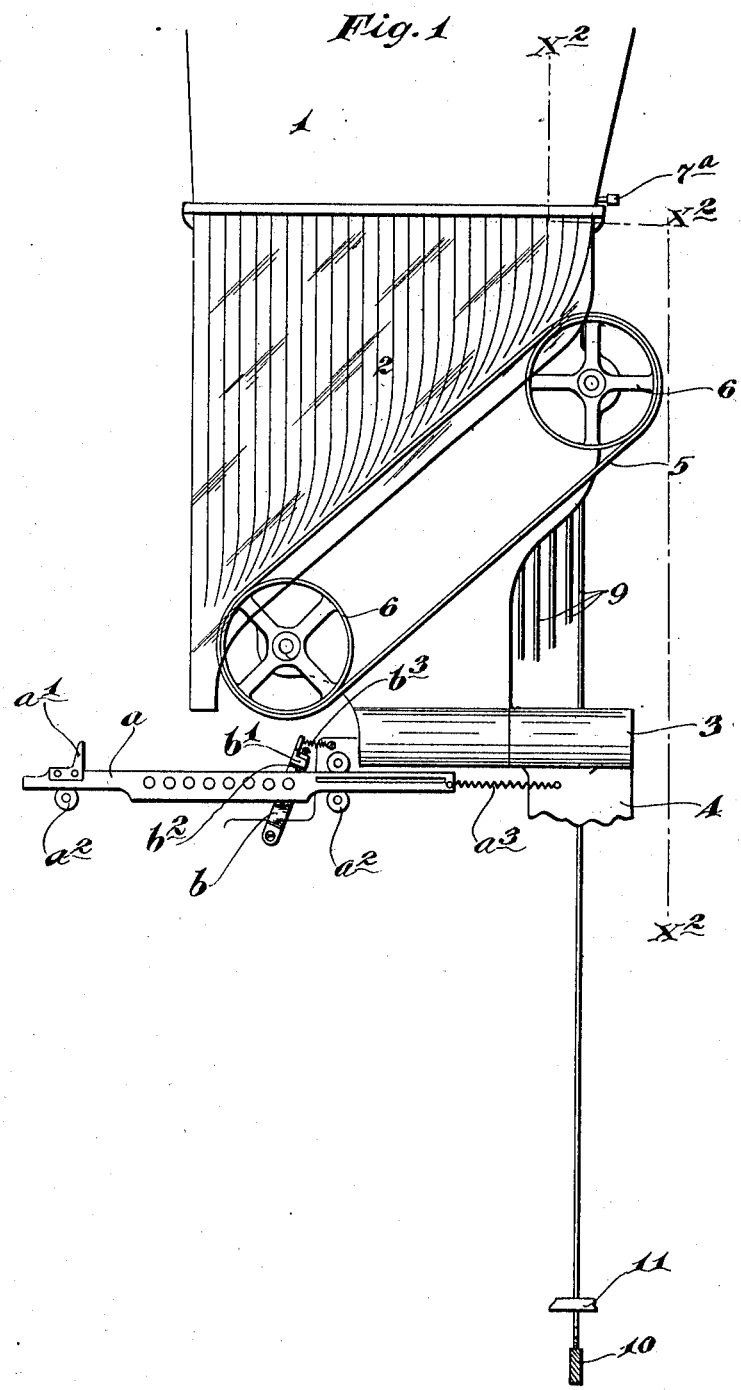

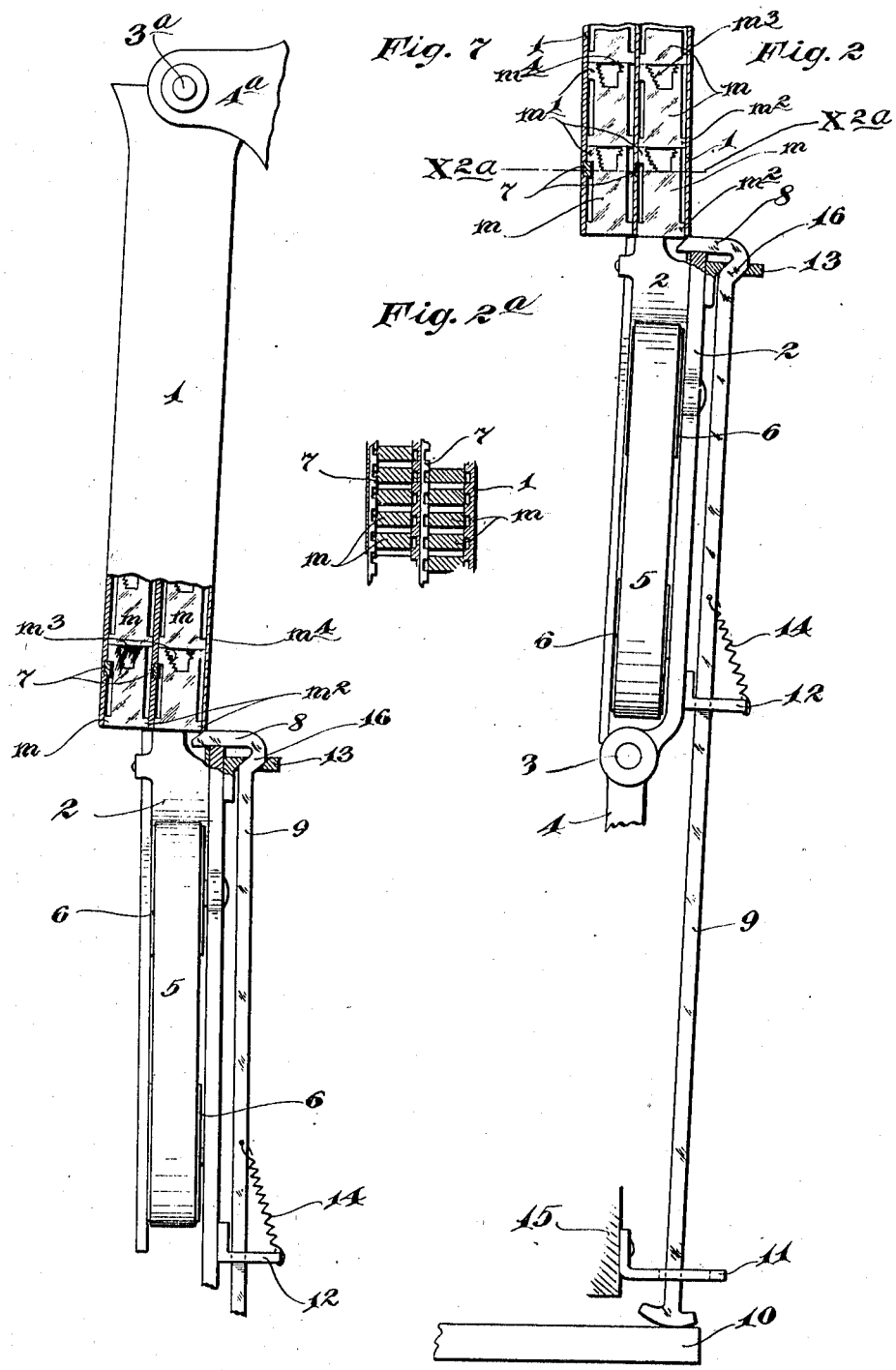

H. PETERSEN.
LINOTYPE MACHINE.
APPLICATION FILED JUNE 5, 1909.
992,900.
Patented May 23, 1911.
6 SHEETS—SHEET 4.
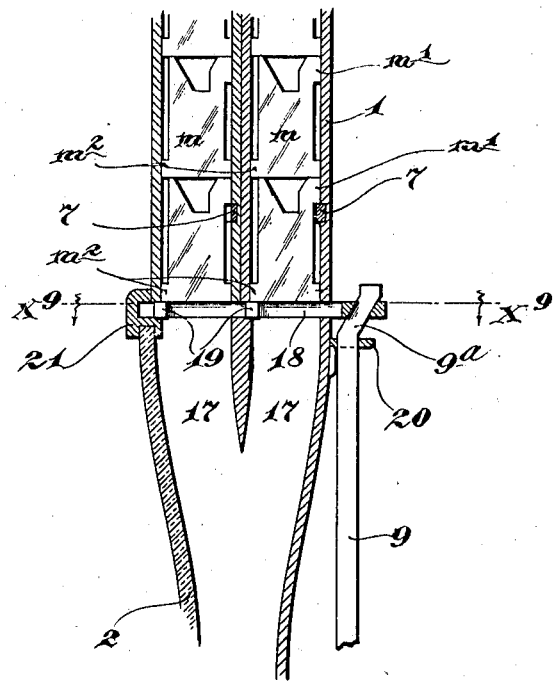
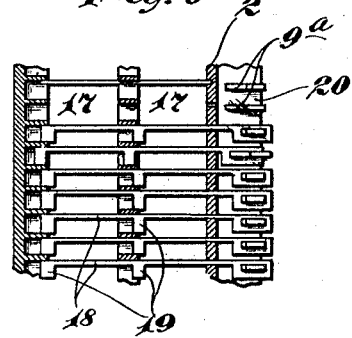
Witnesses:
L. L. Simpson,
Alice J. Swanson.
Inventor:
Hans Petersen
By his Attorneys:
Williamson Merchant H. PETERSEN.
LINOTYPE MACHINE.
APPLICATION FILED JUNE 5, 1909.
992,900.
Patented May 23, 1911.
6 SHEETS—SHEET 5.
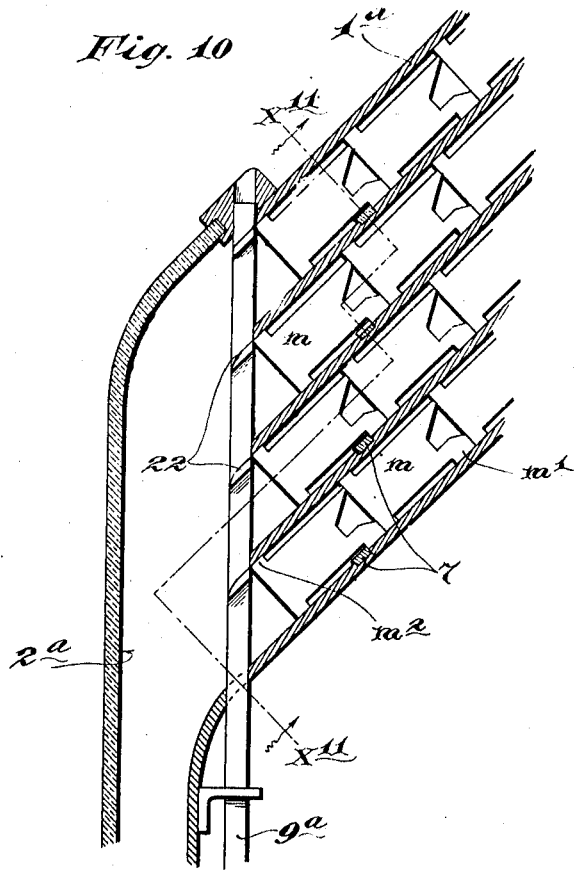
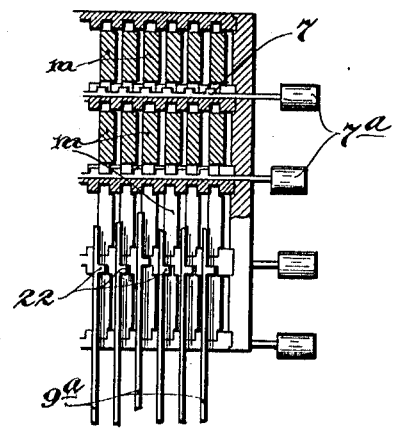
Witnesses:
L. L. Simpson
Alice J. Swanson
Inventor:
Hans Petersen
By his Attorneys:
Williamson & Merchant

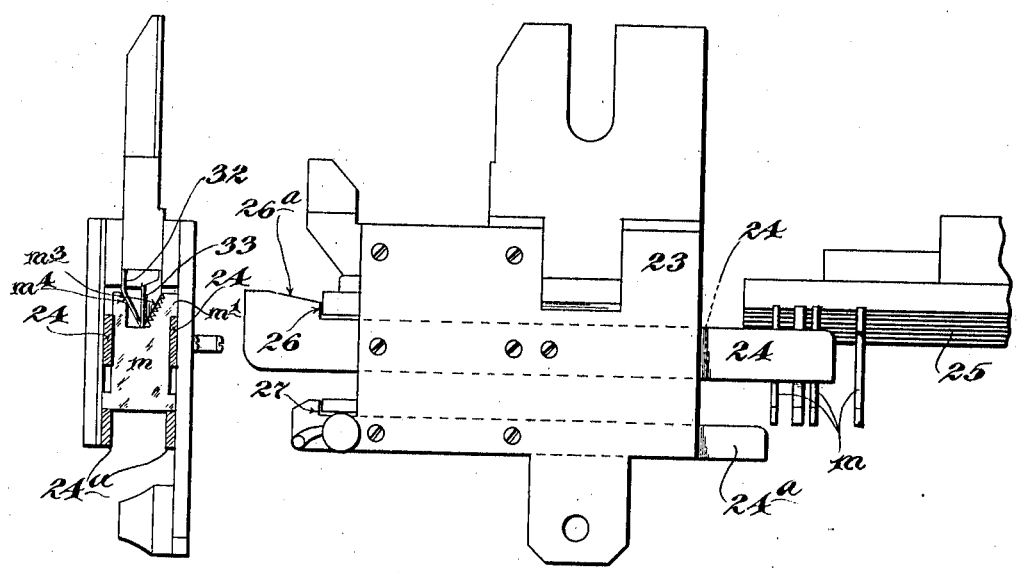

UNITED STATES PATENT OFFICE.

HANS PETERSEN, OF MINNEAPOLIS, MINNESOTA.

LINOTYPE-MACHINE.

992,900.  Specification of Letters Patent.  Patented May 23, 1911.

Application filed June 5, 1909. Serial No. 500,308.

*To all whom it may concern:*

Be it known that I, HANS PETERSEN, a citizen of the United States, residing at Minneapolis, in the county of Hennepin and State of Minnesota, have invented certain new and useful Improvements in Linotype-Machines; and I do hereby declare the following to be a full, clear, and exact description of the invention, such as will enable others skilled in the art to which it appertains to make and use the same.

My invention relates generally to linotype machines of the commercial Mergenthaler type, but is particularly directed to the improvement of machines of this general character wherein multiple magazines and plural fonts or sets of matrices of different size or style type are employed, and wherein by suitable assembling mechanisms including escapement devices, an assembled line may be made up of matrices selected entirely from either, or in part from both fonts, and whereby by suitable distributing mechanisms, the assembled matrices, after the line has been cast therefrom, will be restored to their appropriate magazines.

My invention is directed, first, to the improvement of the matrix assembling mechanism, especially to the escapement devices thereof, and second, to the improvement of the matrix distributing mechanism.

In the accompanying drawings, my invention is shown as applied to a linotype machine of the well known Mergenthaler type, and hence for the purposes of this case, the standard parts of such machine are herein illustrated only in part, and only in so far as they bear particular relation to the novel features of my invention.

Referring to the drawings: Figure 1 is a fragmentary view in front elevation, showing the assembler entrance, the assembler belt portion of the magazine structure, and portions of the key connections; Fig. 2 is a view partly in side elevation and partly in section on the line $x^2$ $x^2$ of Fig. 1, showing substantially the same parts that are shown in Fig. 1; Fig. 2ª is a fragmentary view in horizontal section taken through the matrix magazine; Fig. 3 is a rear elevation with parts broken away, showing portions of the matrix distributing mechanism; Fig. 4 is a vertical section taken on the line $x^4$ $x^4$ of Fig. 3; Fig. 5 is an enlarged section of the font selecting bar, some parts thereof being broken away; Fig. 5ª is an enlarged section of the letter or character selecting bar; Fig. 6 is a face view of one of the matrices; Fig. 7 is a view corresponding to Fig. 2, but illustrating a modified construction; Fig. 8 is a vertical section illustrating a still further modified form of the escapement mechanism, the preferred form of which is shown in Fig. 2; Fig. 9 is a horizontal section taken on the line $x^9$ $x^9$ of Fig. 8; Fig. 10 is a view corresponding to Fig. 8, but illustrating a still further modified form of the escapement mechanism; Fig. 11 is a section taken on the irregular line $x^{11}$ $x^{11}$ of Fig. 10; Fig. 12 is a front elevation of the distributing box; Fig. 13 is an end elevation of the same; Fig. 14 is a detail showing the portion of the second elevator bar and of the distributing box; Fig. 15 is a side elevation of the distributing box bar; and Fig. 16 is an end elevation of said distributing box bar.

First the construction illustrated in Figs. 1 to 6 inclusive will be described. In this construction, two fonts of matrices $m$ are employed, and these are mounted in a fixed magazine 1 having its twin channels alined edgewise and located one in front of the other, so that the same escapement devices may be used for releasing either font of matrices. For coöperation with this fixed magazine 1, the channeled "assembler entrance" 2 is pivotally supported at its lower end at 3 by a suitable supporting bracket 4, and the assembler belt 5, which runs over pulleys 6, and is driven in the customary way, is arranged to oscillate with said assembler entrance 2. The pulleys 6 are shown as journaled on the depending plate portion of the assembler entrance 2, and suitable means, not shown, will be provided for holding the assembler entrance with its open upper end portion alined with either of the two rows of the magazine channels, so that it will receive, according to its set position, matrices from either of the two fonts, which two fonts of matrices, as already indicated, have characters of different size or of different style of face.

In the commercial Mergenthaler linotype machine, to which my invention is illustrated as applied, the matrices dropped from the magazine under the action of key controlled escapement devices, are, as is well known, by the coöperation of the so-called assembler entrance 2 and the assembler belt 5, delivered to a so-called assembler slide $a$, by which the assembled line of matrices is delivered to the "first elevator," (not shown) and by which latter said assembled line of matrices is delivered to the mold, where a slug representing the characters of the assembled line is cast. The matrices are thereafter, of course, distributed to the respective magazine channels.

Hitherto, so far as I am aware, the escapement devices for controlling the escape of the matrices from the respective magazine channels have been arranged to work through the magazine, or at least through one wall thereof.

My improved escapement devices work entirely outside of the magazine, and the matrix engaging ends of the escapement dogs are arranged to engage the lowermost matrices below or entirely outside of the magazine; and for coöperation with these escapement dogs, I provide, so-called font selecting devices, by means of which, at will, either font of matrices may be released and rendered subject only to the escapement dogs, which then control the individual release of the matrices of the selected font under the key action. These font selecting devices are preferably in the form of notched bars 7, mounted for horizontal sliding movements in the lower portion of the magazine 1, in position for coöperation with upper guide lugs $m^1$ of the lowermost matrices of the coöperating font. As is evident, when the notches of the selecting bar 7 are alined with the lugs $m^1$ of the coöperating matrices, that font of matrices will be released or rendered subject only to the coöperating escapement dogs, while when the lugs of the said bar 7 are moved under the said matrix guide lugs $m^1$, the matrices of that font will be locked or held so that no one thereof can be released by action of the escapement dogs.

The escapement dogs are preferably formed or afforded by laterally bent beveled upper ends 8 of escapement rods 9, the lower ends of which rest directly upon corresponding coöperating key levers 10. These escapement rods 9, as shown, work loosely through guide brackets 11, 12 and 13, and they are yieldingly drawn downward by gravity assisted by light coiled springs 14 attached thereto and to the brackets 12. The brackets 12 and 13 are attached to the back of the assembler entrance 2, while the lower bracket 11, is shown as attached to a suitable portion 15 of the machine frame. The upper end of the escapement rod 9 just below the point where it is bent to form the escapement dog 8, is obliquely bent to form a cam section 16 that engages a correspondingly oblique cam passage in the bracket 13, so that when the escapement rod 9 is raised by its key lever 10, the said escapement dog 8 will be retracted or moved out from under the lower guide lug $m^2$ of the engaged matrix; thereby releasing the latter, and permitting the same to fall from the magazine into the assembler entrance 2. It is here important to note that the matrices $m$, at their dog engaged edges, instead of having upper and lower guide lugs, as hitherto for coöperation with the escapement mechanism, is provided on $y$ with the said lower lug $m^2$, so that when this lug has passed the escapement dog, the dropping of the matrix cannot be intercepted by a quick return movement of the escapement dog to its normal position. This quick return movement of the escapement dog and escapement rod, which takes place in the commercial Mergenthaler machine, irrespective of the quick release of the key, insures the return of the escapement dog to its normal position in time to prevent a second matrix from being dropped from the same channel by the same key action.

Referring to Fig. 1, it will be noted that the movable slide $a$, provided with the usual matrix engaging lug $a^1$, is supported by guide rollers $a^2$ and is yieldingly drawn toward the right in respect to said Fig. 1 by a light coiled spring $a^3$. The matrices, as is well known, are delivered to this movable slide $a$ from the assembler entrance 2 and the assembler belt 5.

My invention provides an improvement in the assembler slide brake, to-wit: The brake lever $b$ is pivoted at its lower end to a fixed portion of the machine frame, and is provided at its free end with a lateral projection $b^1$ through which an adjustable set screw $b^2$ works. The end of this set screw $b^2$ frictionally engages with the top of the assembler slide $a$ and is yieldingly pressed against the same by a light coiled spring $b^3$, attached to a fixed part of the machine frame and to the free end of the brake lever $b$. This set screw $b^2$ is adjustable to compensate for wear and to produce the proper frictional engagement with the slide $a$, and it serves to hold the assembler slide $a$ in any position in which it may be forced toward the left against the tension of a retracting spring $a^3$. When the free end of the brake lever $b$ is forced toward the left by the application of the finger or otherwise, the said assembler slide $a$ will be instantly returned to its normal position by this spring $a^3$.

The construction illustrated in Fig. 7 is like that illustrated in Fig. 2, except that the assembler entrance 2 in this instance, is stationary, and the multiple magazine 1 is pivotally supported at its upper end at $3^a$ from a suitable portion $4^a$ of the machine frame, so that either font of the matrices may be alined with the open upper portion of the assembler entrance 2 by oscillatory movements of the magazine structure. Any suitable means, not shown, may, of course, be provided for holding the pivoted magazine 1 in either of its two set positions.

Corresponding parts in Figs. 2 and 7 are indicated by the same characters.

In the modified construction illustrated in Figs. 8 and 9, both the multiple magazine 1 and the assembler entrance 2 are stationary, but in this arrangement, the upper open extremity in said assembler entrance is provided with two channels 17, which channels lead one to each font of matrices. The same notched font selecting bars 7 which are employed in the construction illustrated in Figs. 2 and 7, are also used in this modified construction, and it may be here also stated that the said notched font selecting bars 7 are also employed in the further modified construction illustrated in Figs. 10 and 11, and presently to be described. The escapement dogs employed in the construction illustrated in said Figs. 8 and 9, are however, quite different from those illustrated in Figs. 2 and 7, and are more nearly like those employed in Figs. 10 and 11, but in all of the constructions illustrated, the escapement dogs have this common feature, that they are entirely outside of the magazine, so that the magazine may be removed and another magazine substituted therefor, without requiring any manipulation whatever of the escapement dogs.

The escapement dogs of Figs. 8 and 9 are in the form of small sliding bars 18, provided with lugs 19 that normally engage under the guide lugs $m^2$ of the matrices $m$. For coöperation with these escapement dogs, the escapement rods 9 are provided at their upper ends, with oblique cam acting portions $9^a$ that engage oblique perforations in the projecting ends of the said sliding dogs 18. The straight upper end portions of the escapement dogs 9, are guided by a bracket 20, shown as secured on the back of the assembler entrance 2. The said sliding dogs 18, it will be noted, are mounted to slide directly below the lower end of the magazine 1 in suitable seats formed therefor chiefly in the upper end portion of the assembler entrance 2, but partly in the guide strip 21, shown as secured to the upper front portion of the assembler entrance. With this construction, it is evident, that when an escapement rod 9 is moved upward by the key action mechanism, the corresponding escapement dog 18 will be moved toward the left or forward, and will release one or the other of the corresponding matrices, depending on which one of the two fonts happens to be released by the proper setting of the so-called selecting bar 7. For instance in Fig. 8, the left hand font of matrices is shown as released by its coöperating bar 7, while the right hand font of matrices is locked by its coöperating bar 7, so that at such time, the actuated escapement dogs 18 will release matrices only from the font which is at the left in respect to Fig. 8.

In the construction illustrated in Figs. 10 and 11, the magazine $1^a$ is provided with four fonts of matrices, and the channels thereof are inclined and arranged to deliver into the upper extremity of an assembler entrance $2^a$. In this modified construction, the key lever actuated escapement rod $9^a$ is extended upward through the mouth of the assembler entrance $2^a$, and the escapement dogs for the corresponding matrices of the several fonts, are afforded by lugs 22 directly carried by the corresponding escapement rod. With this construction, the notch selecting bars 7 are relied upon to release the matrices of the selected font, so that they will be subject to the releasing action of the coöperating escapement dogs. As shown in Fig. 11, the selecting bars 7 are provided at their projecting ends, with finger pieces or knobs $7^a$. After the slug has been cast from the assembled line of matrices, the latter are, as is well known, taken up by the so-called second elevator bar and are delivered to a so-called distributer box which latter, in accordance with my invention, is of improved construction and arrangement and is illustrated in Figs. 2, 12 and 14. In the commercial Mergenthaler linotype machine, this distributer box is provided with a grooved distributer bar, which must of necessity, be very accurately made and arranged to very accurately aline with the grooved secondary elevator bar. In practice, it has been found that this requires not only very accurate workmanship, but that wear of the grooves is likely to destroy the fine adjustment and render the parts inoperative. My improvement of this part of the machine consists in providing a distributer box bar which is smooth or without grooves, but is preferably made V-shaped to loosely engage the notches in the upper extremities of the matrices and thereby to assist in holding the matrices in position, and in connection therewith, I provide the distributer box with laterally and vertically spaced rails or runways, on which the matrices are delivered from the second elevator bar and by which they are guided to the customary so-called separator. By this separator, as is well known, the matrices are raised, one after the other, and subjected to the action of the upper or primary distributing screws and to the grooved font selecting bar. There are preferably four rails or runways on the distributing box 23 arranged in upper and lower pairs, designated respectively by the numerals 24 and $24^a$, both of the lower rails $24^a$ project under the delivery end of the upper elevator bar 25, and the left hand upper rail 24, (directions being taken in respect to Fig. 13,) projects farther than either the said lower rails $24^a$, but the right hand upper rail 24 terminates short of the delivery end of the elevator bar 25, so as to permit the required oscillatory movement of the latter. At their left hand ends, (directions being taken in respect to Fig. 12) the said rails 24 and 24$^a$ are provided with stop shoulders 26 and 27 respectively, and the former are provided with oblique cam surfaces 26$^a$ so that the matrices, when raised on the so-called separator will be delivered to the upper or primary distributer screws 28 and the font selecting bar 29. The said screws 28 are driven by suitable gears 30, and the said gears and the said font selecting bar 29 are supported by frame work 31, all by the common construction and arrangement found in the said commercial Mergenthaler linotype.

As best shown in Figs. 13, 15 and 16, the smooth V-shaped bar 32 which takes the place of the customary grooved distributer box bar is rigidly secured to the upper portion of the distributer box 23, above the upper rails 24 in position to loosely engage the points of the distributing teeth of the matrices $m$. At its delivery end, said bar 32 is provided with the customary separator point or flange 33.

The arrangement illustrated in Figs. 3 and 4 is for the separation of the two fonts of matrices and hence, the primary distributer screws 28 and the font selecting bar 29 are arranged to deliver the matrices of one font into a depending spout 34, and the matrices of another font into a depending spout 35. These two spouts 34 and 35 deliver the matrices to the lower or secondary distributer screws 36, and the latter subject the said matrices, which are then selected as to font, but mixed as to letters or characters, to the so-called letter distributing bars 37 and by the latter, the matrices of the two fonts are independently selected and delivered into the appropriate channels provided therefor in the magazine. This latter selecting action is substantially left the same as in the commercial Mergenthaler linotype, but my invention involves a novel departure in the arrangement of the selecting teeth of the matrices and in the selecting ribs and grooves of the font selecting bar, and the letter or character selecting bars, which will presently be described. It should be here noted however, that the matrices, when dropped into the lower ends of the spouts 34 and 35, strike the free lower ends of very light leaf springs 38, which springs are not strong enough to intercept the downward movement of said matrices, but simply exert a gentle force which insures immediate engagement of the screws 36 with the said matrices. Also the upper or primary screws 28 and the lower or secondary screws 36 should be so timed that a matrix dropped from the former will be immediately picked up by the threads of the latter.

In accordance with my invention, the matrices $m$ are provided in one side with letter or character selecting teeth $m^3$ and in their other side with font selecting teeth $m^4$; and the font selecting bar 29 (see particularly Fig. 5) at its lower portion is beveled at one side and provided on its other side with font selecting ribs 29$^a$, which coöperate with the selecting teeth $m^4$ of the matrices $m$. The letter or character selecting bars 37, at their lower portions, are provided on one side with letter or character selecting ribs 37$^a$ for coöperation with the letter selecting teeth $m^3$ of the matrices $m$. In the arrangement shown, the ribs 29$^a$ of the bar 29, are on the left side thereof, and the ribs 37$^a$ of the bar 37 are on the right side thereof, directions being taken in respect to Figs. 4, 5, 5$^a$ and 6. The toothless beveled lower portion of the bar 29 is arranged to engage with points of the teeth $m^3$ of the matrices and thereby to hold the matrices against edgewise rocking movement while sliding along the said bar 29, and for the same reason, the smooth lower side of the bars 37 are constructed to loosely engage the teeth $m^4$ and adjacent straight edges of the said matrices.

Attention is here called to the fact that in all the modifications illustrated in this application, the matrices are provided each with an escapement lug and are cut away above said lug to clear the escapement dog and the matrix escapement which coöperates therewith has a single escapement dog engageable with the said escapement lug, and the coöperative relation thereof is such that, when the escapement dog is retracted, the initial movement thereof will permit the lowermost matrix to entirely drop out of the magazine, and the said dog will be returned into the clearance space of the released matrix in time to catch the lug of the second matrix from the bottom.

What I claim is:

1. In a linotype machine, the combination with an upright matrix magazine and an assembler entrance alined therewith, of matrices assembled in the said magazine, one over the other, and provided each with an escapement lug and cut away above said lug to clear the escapement dog, a matrix escapement having a single escapement dog engageable with the escapement lugs of said matrices, and means for operating said escapement dog, to retract the same so that by initial movements the lowermost matrix will be entirely dropped out of said magazine and the said dog will be returned into the clearance space of the released matrix in time to catch the second matrix from the bottom, substantially as described.

2. In the distributing mechanism of a linotype machine, the combination with matrix feeding devices, of a font selecting bar having grooves on one side only, for the selection of the matrices according to font, and letter or character selecting bars having ribs on one side only for the selection of matrices according to letters or characters.

3. In the distributing mechanism of a linotype machine, the combination with primary and secondary feed screws, of a font selecting bar associated with the primary feed screws and having on one side only, ribs for the selection of matrices according to font, and a multiplicity of letter or character selecting bars associated with said secondary feed screws and having on one side only, ribs for the selection of matrices according to letters or characters.

4. In the distributing mechanism of a linotype machine, the combination with upper primary feed screws and coöperating font selecting bar, of secondary feed screws and coöperating letter or character selecting bars, of spouts receiving from different parts of said font selecting bar and primary feed screws and having their lower ends arranged to deliver said matrices directly and immediately to the ends of said secondary feed screws, and the said secondary feed screws being so timed that matrices dropped from said primary feed screws will be immediately taken up by the said secondary feed screws.

5. In the distributing mechanism of a linotype machine, the combination with upper primary feed screws and coöperating font selecting bar, of lower or secondary feed screws and coöperating letter or character selecting bars, of spouts receiving from different parts of said font selecting bar and primary feed screws and delivering to different members of the said letter or character selecting bars, and springs operative on the dropped matrices to insure initial engagement of the said secondary feed screws therewith.

In testimony whereof I affix my signature in presence of two witnesses.

HANS PETERSEN.

Witnesses:
 ALICE V. SWANSON,
 HARRY D. KILGORE.

---

Copies of this patent may be obtained for five cents each, by addressing the "Commissioner of Patents, Washington, D. C."